May 22, 1945.   A. FROHLICH ET AL   2,376,679
PRODUCTION OF COLOR PHOTOGRAPHIC IMAGES
Filed Feb. 17, 1942
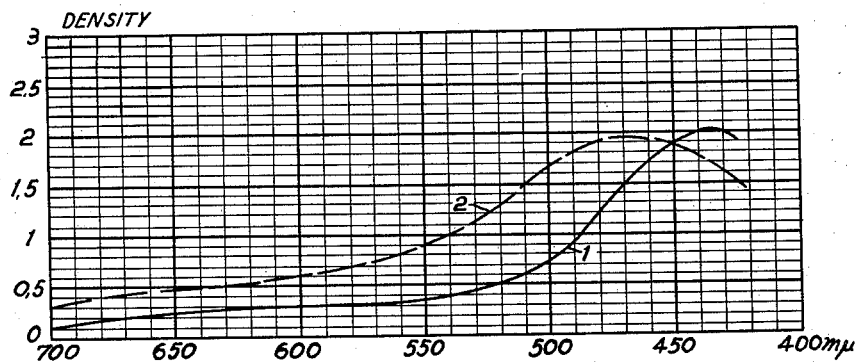
1 ———————— DYESTUFF FROM 1-ACETOACETYLAMINO-4-METHYLOCTADECYL-
AMINOBENZENE-3-SULFONIC ACID
2 — ———— DYESTUFF FROM ACETOACETYLANILINE
INVENTORS
ALFRED FROHLICH AND
WILHELM SCHNEIDER
BY
ATTORNEYS Patented May 22, 1945

UNITED STATES PATENT OFFICE 2,376,679

PRODUCTION OF COLOR PHOTOGRAPHIC IMAGES

Alfred Fröhlich and Wilhelm Schneider, Dessau, Germany, assignors to General Aniline & Film Corporation, New York, N. Y., a corporation of Delaware Application February 17, 1942, Serial No. 431,271
In Germany October 18, 1940

12 Claims. (Cl. 95—6)

Our present invention relates to the production of color photographic images and more particularly of images obtained by color forming development.

In the production of photographic dyestuff images by color forming development it is known to use arylides of $\alpha$-$\beta$-ketocarboxylic acids as dyestuff formers for the yellow image. The dyestuff formers are added to the developing solution or, if they are sufficiently fast to diffusion, to the silver halide emulsion layers during the preparation thereof. The $\alpha$-$\beta$-ketocarboxylic acids include, for instance, the following compounds: acetoacetyl-p-chloraniline, acetoacetylanisidine, acetoacetyl-o-chloro-m-methoxyaniline, acetoacetyl-$\beta$-naphthylamine, acetoacetyl-o-chloraniline, benzoylacetyl-$\beta$-naphthylamine, benzoylacetyl-p-chloraniline, dodecylacetic acid anilide, stearylacetylanthranilic acid, furfuroyl-p-chloranilide, benzoylacetyl-2-aminobenzthiazole. For the production of color photographic images by means of multi-layer materials with emulsion layers containing non-diffusing dyestuff formers it is of especial importance to adjust the color tones of the single partial dyestuff images so that they fulfil the theoretical requirements of the tricolor process as completely as possible. The dyestuffs produced with such dyestuff formers must therefore exhibit quite particular spectral properties in order that an optimum of the color reproduction is reached. It is, for instance, necessary that on development the dyestuff formers for the yellow yield dyestuffs the absorption maximum of which is as far as possible in the shortwave region of the spectrum and the absorption range of which is inclined towards the long-wave region as steeply as possible. When the dyestuff formers are added to the silver halide emulsion before casting, they must still show different other properties as, for instance, indifferent behavior to the silver halide emulsion and easy solubility in water or diluted alkalies at temperatures which essentially correspond with the temperature of the silver halide emulsion to be cast.

It is an object of the present invention to provide new dyestuff formers for the yellow which correspond with these requirements as completely as possible. Further objects will appear more in detail hereinafter. Reference is made to the accompanying drawing in which an absorption curve of a dyestuff formed from a dyestuff component of the present invention is compared with an absorption curve of a dyestuff derived from a known component.

The objects of the invention are accomplished by using as the dyestuff component for the yellow aromatic acylacetic acid amides which carry at least one group capable of rendering the component water-soluble and one or several secondary or tertiary amino groups in the ring system linked to the amide group, these amino groups having linked thereto radicals producing fastness to diffusion, if required. The dyestuff formers of the invention produce dyestuffs which exhibit an absorption maximum below 450 m$\mu$, a very steep descent of the absorption curve towards the long-wave region and a very favorable solubility in diluted alkalies. The absorptive powers are shown in the drawing in which 1 is the absorption curve of the dyestuff formed from 1-acetoacetylamino - 4 - methyloctadecylaminobenzene-3-sulfonic acid and p-dimethylaminoaniline and 2 is the absorption curve of the dyestuff produced from the known dyestuff component acetoacetylaniline and the developing substance.

Dyestuff formers of the present invention are, for instance, the following compounds: 1-acetoacetylamino - 4 - methyloctadecylaminobenzene-3-sulfonic acid, 1-acetoacetylamino-4-methyloctadecylaminonaphthalene - 3 - sulfonic acid, 1 - acetoacetylamino - 2 - methyloctadecylaminobenzene-5-sulfonic acid, 1-acetoacetylamino-4-octadecylaminobenzene-3-sulfonic acid, 1-acetoacetylamino-4 - perhydrodiphenylaminobenzene-3-sulfonic acid, 1-acetoacetylamino-4-abietinylaminobenzene-3-sulfonic acid, 1-stearylacetylamino-4-methylcyclohexylaminobenzene-3 - carboxylic acid, 1-benzoylacetylamino-2-methyl-octadecyl aminobenzene-5-carboxylic acid, the nucleus of the benzoyl radical of which may carry any substituents, 2.6-di-(acetoacetylamino)-1-methyloctadecylaminobenzene - 4 - sulfonic acid, 2.5-di-(acetoacetylamino) - 1 - methyloctadecylaminobenzene-4-sulfonic acid, and 1-acetoacetylamino-4-sulfooleylaminobenzene.

The dyestuff formers are prepared in known manner by reacting the correseponding nitrochlorobenzenecarboxylic acids or -sulfonic acids with the primary or secondary amines, the amino group being substituted for the labile chlorine atom whereupon the obtained compound is reduced and the acylacetic acid group is introduced in known manner.

The dyestuff formers of the invention are especially easily soluble, for instance, as alkali metal salts and the solution can be incorporated into the silver halide emulsion before casting. The secondary or tertiary amino groups may carry various radicals preventing diffusion as, for instance, disclosed in U. S. Patents 2,186,852, 2,186,-851, 2,186,733, 2,186,732, 2,186,734, 2,186,719, 2,186,847 dated January 9, 1940, U. S. Patents 2,179,238, 2,179,244, 2,178,612 dated November 7, 1939, and U. S. Patents 2,280,722, 2,292,575, 2,307,-399 and 2,303,928, Italian Patents 344,648, 344,649, French Patent 844,637, and U. S. Patent applications Ser. Nos. 284,258 filed July 13, 1939, 333,814 filed May 7, 1940, 335,144 filed May 14, 1940, 341,180 filed June 18, 1940, and 362,592 filed October 24, 1940. In particular the secondary and tertiary amino groups may contain one or several straight or branched carbon chains as substituents, the total number of the carbon atoms forming these chains being at least nine. Moreover hydroaromatic or aromatic-hydroaromatic or aliphatic-hydroaromatic radicals of natural or synthetic origin may be used as substituents.

The silver halide emulsions prepared by means of the non-diffusing dyestuff formers may be cast to form single layers or worked up into multi-layer materials containing the several emulsion layers on one or both sides of a support and, if necessary, filter layers, intermediate layers or anti-halation layers. The color images may be produced by simple or reversal development as negatives or positives, respectively.

For the production of color images 3 g. of the dyestuff former are dissolved in a mixture of 100 cc. of water and 8 cc. of n/1 sodium hydroxide solution. The obtained solution is then added to 300 cc. of a silver halide gelatin emulsion whereupon the emulsion is usually cast to form a layer and dried. The exposed layer is treated with a color forming developer as, for instance, p-dimethylaminoaniline. After removing the additionally formed silver image by means of Farmer's reducer (potassium ferricyanide solution) one obtains a yellow dyestuff image.

Instead of the sodium salt other soluble salts of the dyestuff former may be used, for instance other alkali metal salts. Groups making the dyestuff former soluble in water are, for instance, sulfo, carboxyl and hydroxyl.

Further dyestuff formers according to the present invention are, for instance, the following compounds:

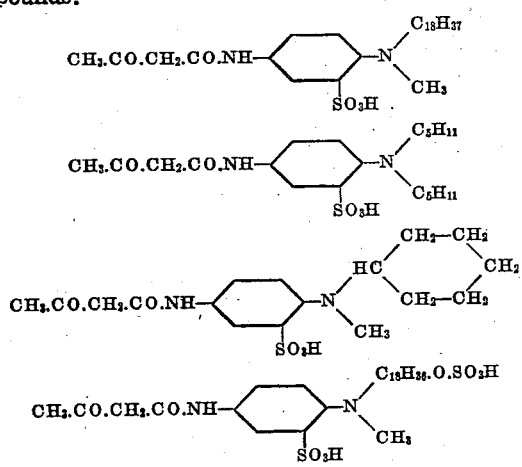

We claim:

1. In a process of producing color photographic images by color forming development, the improvement which comprises exposing a photographic silver halide gelatin emulsion containing an acylacetic acid arylide, said acyl radical being selected from the class consisting of acyl radicals of the aliphatic and aromatic series, said arylide containing at least one water solubilizing group and said arylide having at least one amino group linked to the ring system attached to the amide nitrogen atom of said arylide, said amino group being selected from the group consisting of

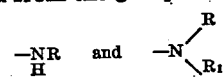

wherein R is a member selected from the class consisting of long-chain aliphatic hydrocarbon, hydroaromatic and aliphatic hydroaromatic radicals and $R_1$ is an aliphatic hydrocarbon radical, said water-solubilizing group being attached to a carbon atom selected from the group consisting of a nuclear carbon atom of said ring system and a carbon atom of said long-chain aliphatic hydrocarbon radical, and developing said emulsion with an aromatic primary amino developer.

2. The process as defined in claim 1 wherein the substituents on the nitrogen atom of said amino group contain at least 9 carbon atoms.

3. A silver halide gelatin emulsion for color forming development containing an acylacetic acid arylide, said acyl radical being selected from the class consisting of acyl radicals of the aliphatic and aromatic series, said arylide containing at least one water-solubilizing group and said arylide having at least one amino group linked to the ring system attached to the amide nitrogen atom of said arylide, said amino group being selected from the class consisting of

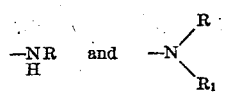

in which R is selected from the class consisting of long-chain aliphatic hydrocarbon, hydroaromatic, and aliphatic hydroaromatic radicals and $R_1$ is an aliphatic hydrocarbon radical, said water-solubilizing group being attached to a carbon atom selected from the class consisting of a nuclear carbon atom of said ring system and a carbon atom of said long chain aliphatic hydrocarbon radical.

4. The composition as defined in claim 3 wherein said acylacetic arylide is an acetyl acetic acid arylide.

5. The composition as defined in claim 3 wherein said acylacetic acid arylide is an acetyl acetic acid arylide and in which the substituents on the nitrogen atom of said amino group contain at least 9 carbon atoms.

6. In a process of producing color photographic images by color-forming development, the improvement which comprises developing with an aromatic primary amino developer, an exposed silver halide emulsion containing a compound of the following formula:

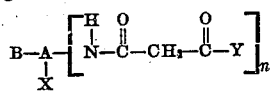

wherein

A is an aromatic radical,
X is a water-solubilizing group,
Y is an acyl radical selected from the class consisting of acyl radicals of the aliphatic and aromatic series,
B is an amino group linked to a nuclear carbon atom of said aromatic radical, said amino group being selected from the class consisting of

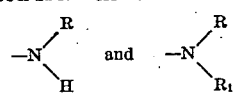

wherein

R is a member of the class consisting of long-chain aliphatic hydrocarbon, hydroaromatic, and aliphatic-hydroaromatic radicals, and $R_1$ is an aliphatic hydrocarbon radical, and $n$ is a member of the group consisting of 1 and 2.

7. The process as defined in claim 6 wherein A is phenyl and $n$ is 1 and X is a sulfonic acid group.

8. A silver halide gelatin emulsion for color-forming development containing as a color former a compound of the following formula

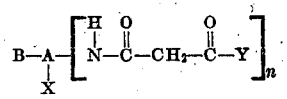

wherein

A is an aromatic radical,
X is a water-solubilizing group,
Y is an acyl radical selected from the class consisting of acyl radicals of the aliphatic and aromatic series,
B is an amino group linked to a nuclear carbon atom of said aromatic radical, said amino group being selected from the class consisting of

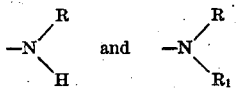

wherein

R is a member of the class consisting of long chain aliphatic hydrocarbon, hydroaromatic, and aliphatic-hydroaromatic radicals, and
$R_1$ is an aliphatic hydrocarbon radical, and
$n$ is a member of the group consisting of 1 and 2.

9. A silver halide emulsion as defined in claim 8 wherein A is phenyl, $n$ is 1 and X is a sulfonic acid group.

10. A silver halide gelatin emulsion for color-forming development containing 1-acetoacetyl-amino-4-methyl-octadecylaminobenzene-3-sulfonic acid.

11. A silver halide gelatin emulsion for color-forming development containing 1-acetoacetyl-amino-4-methyl-ocadecylamino-naphthalene-3-sulfonic acid.

12. A silver halide gelatin emulsion for color-forming development containing 1-acetoacetyl-amino-2-methyl octadecylamino benzene-5-sulfonic acid.

ALFRED FRÖHLICH.
WILHELM SCHNEIDER.